United States Patent [19]

Kimura

[11] Patent Number: 4,811,056

[45] Date of Patent: Mar. 7, 1989

[54] IMAGE FORMING APPARATUS CAPABLE OF DETECTING ORIGINAL-IMAGE DENSITY

[75] Inventor: Masashi Kimura, Yokohama, Japan

[73] Assignee: Kabushiki Kaisha Toshiba, Kawasaki, Japan

[21] Appl. No.: 100,989

[22] Filed: Sep. 25, 1987

[30] Foreign Application Priority Data

Sep. 30, 1986 [JP] Japan ................... 61-229794

[51] Int. Cl.⁴ ............................................. G03B 27/72
[52] U.S. Cl. ............................................ 355/68; 355/71
[58] Field of Search ................. 355/1, 14 E, 68, 67, 355/71; 358/293, 300; 250/228

[56] References Cited

U.S. PATENT DOCUMENTS

| | | | |
|---|---|---|---|
| 4,231,657 | 11/1980 | Iwatnatsu | 355/71 |
| 4,321,630 | 3/1982 | Kramer | 358/293 X |
| 4,371,897 | 2/1983 | Kramer | 358/300 X |
| 4,465,358 | 8/1984 | Miura | 355/67 X |
| 4,544,258 | 10/1985 | Takano | 355/68 X |

FOREIGN PATENT DOCUMENTS 57-210369 12/1982 Japan .
58-214142 12/1983 Japan .

Primary Examiner—L. T. Hix
Assistant Examiner—D. Rutledge
Attorney, Agent, or Firm—Cushman, Darby & Cushman

[57] ABSTRACT

Light beam radiated from an exposure light source of a copying machine is reflected by a predetermined portion of an original. First reflected light beam of reflected light passing through a SELFOC lens is radiated on the surface of a photosensitive body to form an electrostatic latent image thereon. An original image density detecting device is provided next to the SELFOC lens and includes a housing having a slit formed in its upper wall along the axial direction of the photosensitive body, a reflecting plate, provided on an inner bottom wall surface of the housing, and having an aluminum tape adhered on its surface, and a photosensor mounted on an inner upper wall surface of the housing. Of the light beams reflected by the original, second reflected light beam reflected near the SELFOC lens and not passing therethrough is incident into the housing from the slit and reaches the reflecting plate. Third reflected light beam reflected on the surface of the reflecting plate is received by the photosensor, and the photosensor detects the original-image density.

15 Claims, 4 Drawing Sheets

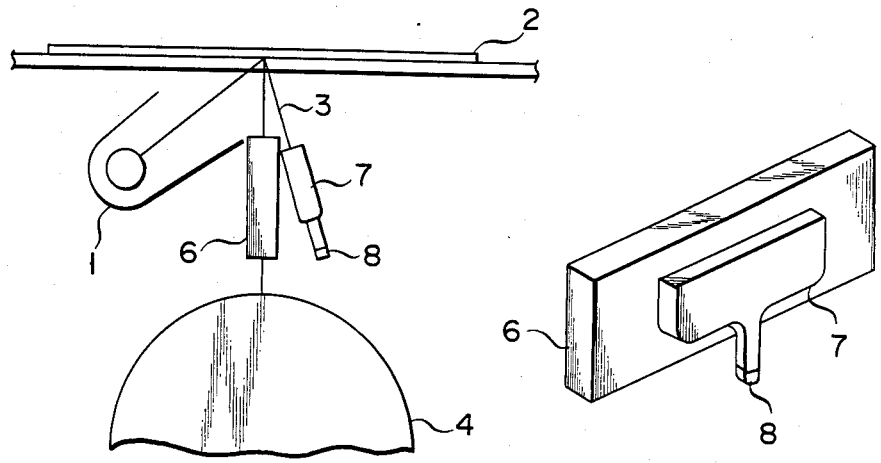
FIG. 1A (PRIOR ART)
FIG. 1B (PRIOR ART)
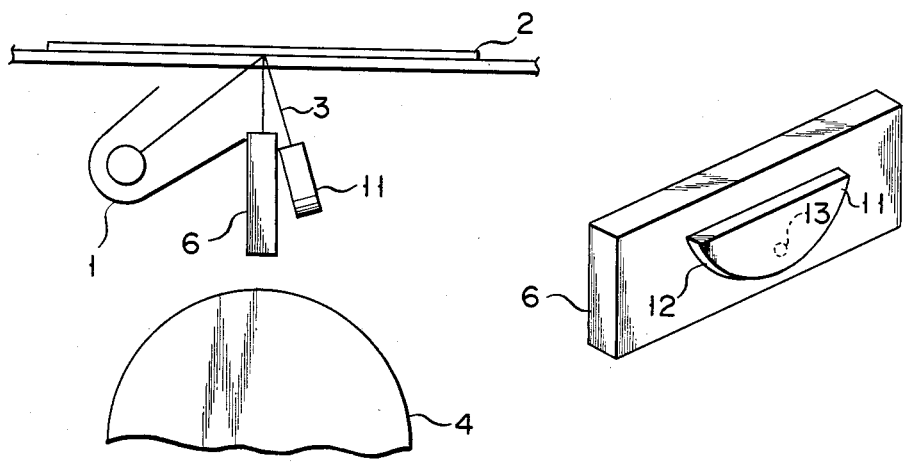
FIG. 2A (PRIOR ART)
FIG. 2B (PRIOR ART)

IMAGE FORMING APPARATUS CAPABLE OF DETECTING ORIGINAL-IMAGE DENSITY

BACKGROUND OF THE INVENTION

1. Field of the Invention

The present invention relates to an image forming apparatus capable of detecting original-images density such as a copying machine. More particularly, the invention relates to an image forming apparatus capable of detecting the original-image density by detecting the quantity of light reflected by an original which is illuminated by an exposure light source.

2. Description of the Prior Art

In recent years, in order to obtain a good image, an image forming apparatus such as a copying machine employs an automatic exposure unit for automatically controlling an amount of light radiated on a document from an exposure light source in correspondence to the density of an original image.

Such an automatic exposure unit detects an original-image density by some means, and changes an exposure quantity of light and the like in correspondence thereto, thereby obtaining a proper image. Examples of a conventional original-image density detecting device used in the above unit are shown in FIFS. 1A and 1B and FIGS. 2A and 2B.

In the device shown in FIGS. 1A and 1B, light emitted from exposure light source 1 is radiated on original 2, and reflected light beam 3 from original 2 is converged on sensor 8 formed by a photoelectric conversion element such as a diode or a phototransistor by SELFOC lens (a trade name of a self focusing lens) 7 for detection. Thus, the intensity of reflected light is detected to detect the image density of original 2 (Japanese Patent Disclosure (Kokai) No. 57-210370). Lens 7 is provided near SELFOC lens 6 for guiding the reflected light beam from original 2 on photosensitive body 4, and its dimension in the widthwise direction of the photosensitive body is increased as long as possible to enlarge a converging area, thereby improving detection accuracy of image density. That is, as shown in FIG. 1B, light-receiving surface 9 on an upper portion of lens 7 is elongated to focus reflected light within a range as wide as possible to sensor 8.

However, in this case, although the detection accuracy is improved, such a structure is so complicated as to make manufacture difficult, resulting in an expensive apparatus.

In the device shown in FIGS. 2A and 2B, box member 11 is provided near SELFOC lens 6, curved reflecting plate 12 is provided on a bottom portion of box member 11, and sensor 13 is provided at a focal point of plate 12. Light beam from exposure light source 1 reflected by original 2 and reaching around lens 6 is further reflected 12 and converged on sensor 13. Thus, the quantity or reflected light is detected to detect the image density of original 2 (Japanese Patent Disclosure (KOKAI) No. 58-214142 and Japanese Utility Model Disclosure (KOKAI) No. 58-62357). Also in this device, the dimension of an opening at an upper portion of box member 11 is increased along the widthwise direction of a photosensitive body to improve detection accuracy.

However, in this case, high accuracy is required for a reflecting surface of plate 12 to focus the reflected light of wide range to sensor 13, resulting in cumbersome manufacture and an expensive apparatus as described above.

Thus, the above conventional apparatuses are both expensive to prevent realization of an inexpensive copying machine, make it difficult to apply an automatic exposure unit to a home copying machine, and prevent improvement in image quality.

SUMMARY OF THE INVENTION

It is therefore, an object of the present invention to provide an image forming apparatus having an inexpensive original-image density detecting device which is not difficult to manufacture.

According to an aspect of the present invention, there is provided an image forming apparatus capable of detecting original-image density comprising an exposure light source emitting a light beam to an original; an image carrier adapted to carry thereon an electrostatic latent image corresponding to an original image; guiding means for guiding a first reflected light beam reflected from said original to said image carrier, a reflector, provided near said guiding means, for reflecting second reflected light beam reflected from said original and not passing through said guiding means; and photodetecting means for receiving third reflected light from said reflector, provided opposite to said reflector.

According to another aspect of the present invention, there is provided an image forming apparatus capable of detecting original-image density comprising: an exposure light source emitting a light beam to an original, an image carrier adapted to carry thereon an electrostatic latent image corresponding to an original image, guiding means for guiding a first reflected light beam reflected from said original to said image carrier, a housing provided near said guiding means, a slit being formed in a wall portion of said housing at a side of a document, and second reflected light beam reflected from said original and not passing through said guiding means being incident through said slit; a reflector, provided on an inner wall surface opposite to a slit formation wall of said housing, for reflecting the second reflected light beam incident through said slit; and photodetecting means for receiving third reflected light beam from said reflector, provided to oppose said reflector in said housing.

A photosensor normally used as a photodetecting means has a predetermined light-receiving angle and can detect an amount of light falling within a range of this light-receiving angle. Therefore, as described above, when reflected light beam from an original is reflected again by a reflecting body and incident on the photodetecting means, part of the reflected light beams corresponding to the light-receiving angle of the photodetecting means is detected. In order to assure good detection accuracy of image density, the reflected light beams falling within a range of the light-receiving angle of the photodetecting means need only be detected. For this purpose, only the reflecting body and the photodetecting means need be provided, as described above. Thus, the image density of an original can be detected with high accuracy without using a converging means and providing a reflecting surface with high accuracy, resulting in easy manufacture and an inexpensive device. In addition, since the reflected light is focused on the photodetecting means using the reflecting body, a distance from the original to the photodetecting means can be decreased and compactness of the device is not prevented.

BRIEF DESCRIPTION OF THE DRAWINGS

FIG. 1 is a schematic view showing an arrangement of an image forming apparatus using a conventional original-image density detecting device;

FIG. 1B is a perspective view of the original image density detecting device shown in FIG. 1A;

FIG. 2 is a schematic view showing an arrangement of an image forming apparatus using another conventional original-image density detecting device;

FIG. 2B is a perspective view of the original-image density detecting device shown in FIG. 2A;

DETAILED DESCRIPTION OF THE PREFERRED EMBODIMENT

Figure 3:
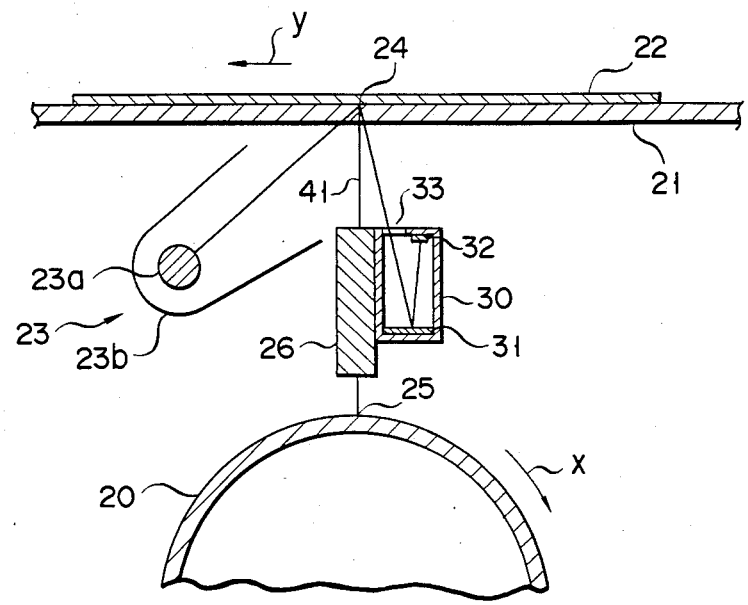
FIG. 3 is a schematic view showing an arrangement of a copying machine capable of detecting original-image density according to an embodiment of the present invention.
Figure 4:
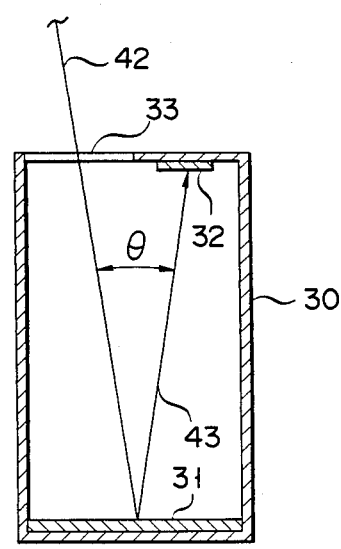
FIG. 4 is a sectional view of the document image density detecting device according to the embodiment.

An embodiment of the present invention will be described in detail with reference to FIGS. 3 to 7. FIG. 3 is a schematic view showing an arrangement of a copying machine according to the embodiment of the present invention, and FIG. 4 is a sectional view of the original image detecting device. Photosensitive body 20 is a cylindrical image carrier and arranged to be rotatable in a direction indicated by arrow x. When a light beam is incident on the surface of body 20, an electrostatic latent image is formed. Table 21 is provided above body 20, and original 22 placed on table 21 is moved together with table 21 in a direction indicated by arrow y. Exposure unit 27 is constituted by exposure light source 23 and SELFOC lens 26. Light source 23 is constituted by lamp 23a and reflector 23b and provided below table 21. Light source 23 focuses light on irradiation portion 24 of original 22. Lens 26 is provided between body 20 and table 21. Part (to be referred to as first reflected light beam 41 hereinafter) of reflected light beams reflected by irradiation portion 24 is incident on lens 26, and this first reflected light beam 41 is focused on portion 25 of body 20, thereby forming the electrostatic latent image there as described above.

Figure 5:
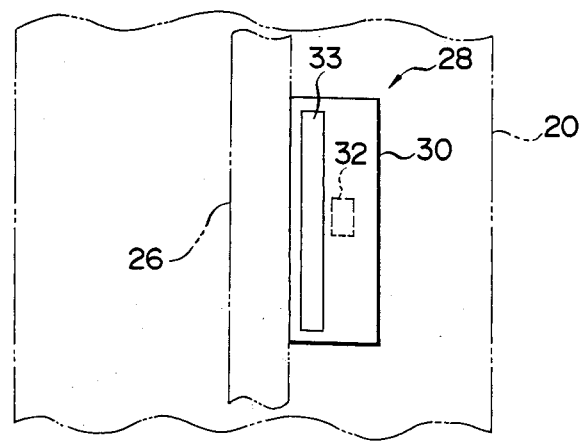
FIG. 5 is a plan view thereof.

Original image density detecting device 28 is provided adjacent to lens 26 and includes housing 30, reflecting plate 31 provided on an inner bottom wall surface of housing 30, and photosensor 32 mounted on an inner upper wall surface of housing 30. As shown in FIG. 5, slit 33 is formed in an upper surface of housing 30 to extend along the axial direction of body 20, and part (to be referred to as second reflected light beam 42 hereinafter) of the reflected light beams reflected by irradiation portion 24 and not passing through lens 26 is incident into housing 30 through slit 33. Plate 31 is formed by an aluminum tape and reflects second reflected light beam 42 (this reflected light beam will be referred to as third reflected light beam 43 hereinafter). Photosensor 32 is formed by a photoelectric conversion element and receives third reflected light beam 43. In this case, as shown in FIG. 4, assume that an angle defined by light beams 42 and 43 is $\theta$. If $\theta$ exceeds 60 degrees, the width of housing 30 is increased excessively, i.e., compactness of the apparatus is prevented. Therefore, $\theta$ preferably falls within a range of $0 < \theta < 60$ degrees.

Figure 6:
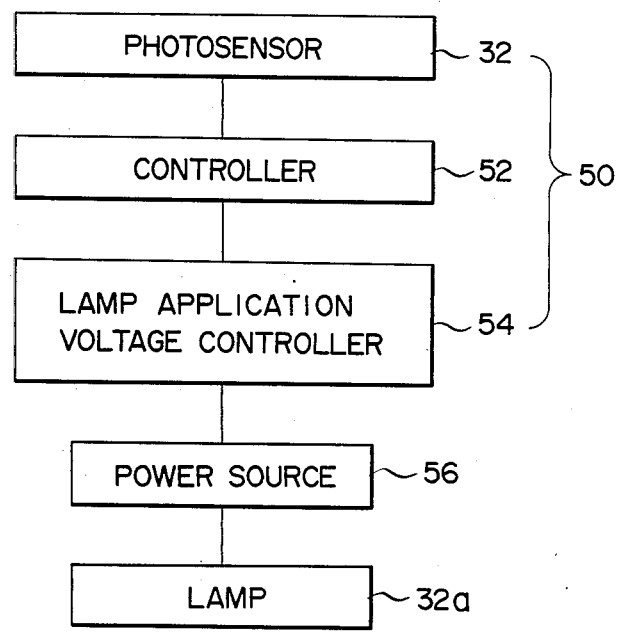
FIG. 6 is a block diagram of an automatic exposure unit.

FIG. 6 is a block diagram of automatic exposure unit 50. Unit 50 includes above-mentioned device 28, controller 52 for receiving a detection signal from photosensor 32, and lamp application voltage controller 54 for receiving a control signal from controller 52 to control a voltage to be applied to lamp 32a. When a signal is input to power source 56 from controller 54, a predetermined voltage is applied to lamp 32a from power source 56.

An operation of this embodiment will be described below. First, body 20 is rotated in the x direction, an image forming apparatus (not shown) including, e.g., a charging unit and a developing unit, disposed around body 20 is set in an operative state, and lamp 32a of light source 23 is turned on to start a copying operation. Light beam from light source 23 is radiated on irradiation portion 24 of original 22 through table 21 while original 22 is moved together with table 21 in the y direction. The radiated light beam is reflected by irradiation portion 24, and light beam 41 thereof is focused on portion 25 on the surface of body 20 through lens 26. In this case, the surface of body 20 is uniformly charged by the charging unit (not shown) before light beam 41 from original 22 is focused thereon. Since original 22 is moved together with table 21 in the y direction and body 20 is pivoted in the x direction, light beam 41 is sequentially radiated on body 20 in correspondence to original 22, thereby forming an electrostatic latent image corresponding to original 22 on body 20.

During the above exposure operation, light beam 42 from original 22 is incident into housing 30 of device 28 through slit 33 and reaches plate 31. Light beam 43 reflected by plate 31 is received by photosensor 32. Photosensor 32 outputs an electric signal corresponding to an amount of light beam 43 to controller 52. In this case, the amount of light beam 43 received by photosensor 32 corresponds to the image density at irradiation portion 24 of original 22. An electric signal value corresponding to a predetermined document image density is preset in controller 52. When the electric signal from photosensor 32 is larger than the predetermined value, i.e., the image density is higher than the predetermined value, controller 52 outputs a signal for reducing a voltage to be applied to lamp 23a from power source 56 to controller 54. When the electric signal from photosensor 32 is smaller than the predetermined value, i.e., the image density is lower than the predetermined value, controller 52 outputs a signal for reducing a voltage to be applied to lamp 23a from power source 56 to controller 54. Controller 54 which receives the above signals controls a voltage of power source 56 in accordance with the received signals and adjusts a radiation light amount of lamp 23a. Thus, the exposure light intensity from light source 23 can be automatically controlled.

As has been described above, the document image density detecting device according to the above embodiment has a very simple structure in which only plate 31 and photosensor 32 are provided in housing 30 and hence can be easily manufactured at low cost. In addition, since photosensor 32 has a predetermined light-receiving angle regardless of such a simple structure, light beam 43 falling within a range of the light-receiving angle can be received, thereby detecting the image density of original 22 with high accuracy.

Figure 7:
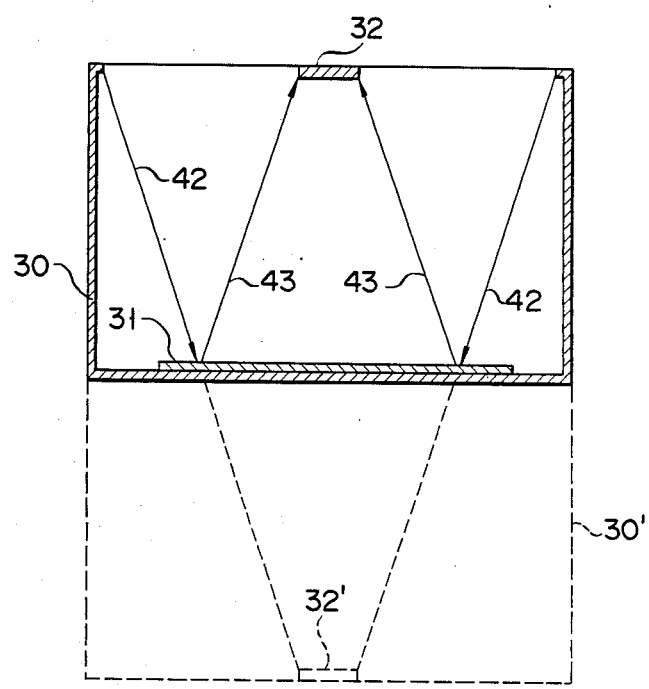
FIG. 7 is a schematic view for explaining an effect of a reflecting body.

Note that as shown by a broken line in FIG. 7, if light beam 42 from the slit is directly incident on photosensor 32' not through plate 31, light falling within a range of the light-receiving angle of photosensor 32' can be received, and the image density can be detected with high accuracy. In this case, however, a height of housing 30' must be increased twice that of housing 30 with plate 31. That is, by providing plate 31 as in this embodiment, a height of the housing can be decreased half that of the housing without plate 31, thereby contributing to compactness of the device.

Although a length of slit 33 and a height of housing 33 may be arbitrarily set, they are preferably determined in consideration of the light-receiving angle of photosensor 32. More preferably, light beam 42 is incident so that an incident range of light beam 43 corresponds to the light-receiving angle of photosensor 32. In this case, the reflected light can be detected throughout the range of light-receiving angle of photosensor 32, and a size of housing 30 can be minimized. That is, high detection accuracy and compactness of the apparatus can be achieved at the same time.

The present invention is not limited to the above embodiment but can be variously modified. For example, in the above embodiment, the original-image density detecting device is applied to the automatic exposure unit. However, the original-image density detecting device may be independently used, or may be applied to a unit for controlling a developing density in accordance with an original-image density. In addition, in the above embodiment, the second reflected light is reflected by the reflecting plate formed by an aluminum tape. However, materials such as other metal plates may be arbitrarily used, or the bottom surface of the housing may be painted with a white paint. Furthermore, the reflecting plate need not be a flat plate but may take any shape as long as the reflected light can be efficiently incident on the photodetecting means.

What is claimed is:

1. An image forming apparatus capable of detecting original-image density comprising:
   an exposure light source emitting a light beam to an original;
   an image carrier adapted to carry thereon an electrostatic latent image corresponding to an original image;
   guiding means for guiding a first reflected light beam reflected from said original to said image carrier;
   a hollow housing provided near said guiding means and having an opening opposing said original for allowing the passing of a second reflected light beam reflected from said original and not passing through said guiding means;
   a reflector provided on an inner wall surface of said housing, which opposes said opening, and which has a flat reflecting surface, for reflecting said second reflected light beam; and
   photodetecting means opposing said reflector, and being responsive to light incident thereon within a predetermined light-receiving angle for detecting a quantity of a third reflected light beam reflected from said reflector and incident on said photodetecting means within said predetermined light-receiving angle.

2. An apparatus according to claim 1, wherein the surface of said reflector is formed of a metal.

3. An apparatus according to claim 1, wherein an angle defined by the second and third reflected light beams is greater than 0 degrees and less than or equal to 60 degrees.

4. An apparatus according to claim 1, wherein said photodetecting means outputs a signal representing the intensity of the light applied to detect by said photodetecting means, and which further comprises control means for controlling said exposure light source in accordance with the signal supplied from said photodetecting means, so that said exposure light source emits light of an adjusted intensity.

5. An apparatus according to claim 1, wherein said reflector and said photodetecting means are disposed so that said photodetecting means receives light reflected from a substantial portion of the entire length of said image carrier.

6. An image forming apparatus capable of detecting original-image density comprising:
   an exposure light source emitting a light beam to an original;
   an image carrier adapted to carry thereon an electrostatic latent image corresponding to an original image;
   guiding means for guiding a first reflected light beam reflected from said original to said image carrier;
   a hollow housing provided near said guiding means and having a wall opposing said original and a slit made in said wall for allowing the passing of a second reflected light beam reflected from said original and not passing through said guiding means;
   a reflector provided on an inner wall surface of said housing, which opposes said wall having said slit, and has a flat reflecting surface, for reflecting said second reflected light beam incident through said slit; and
   photodetecting means opposing said reflector and being responsive to light incident thereon within a predetermined light-receiving angle, for detecting a quantity of a third reflected light beam reflected from said reflector and incident on said photodetecting means within said predetermined light-receiving angle.

7. An apparatus according to claim 6, wherein the reflecting surface of said reflector is formed of a metal 8. An apparatus according to claim 6, wherein an angle defined by the second and third reflected light beams is greater than 0 degrees and less than or equal to 60 degrees.

9. An apparatus according to claim 6, wherein said housing is provided adjacent to said imaging means.

10. An apparatus according to claim 9, wherein said image carrier has a cylindrical shape, and said housing extends along an axial direction of said image carrier.

11. An apparatus according to claim 10, wherein a longitudinal direction of said slit extends along the axial direction of said image carrier.

12. An apparatus according to claim 11 wherein said slit is formed to cause said second reflected light beam to be incident on said reflector so that said predetermined light-receiving angle of said photodetecting means encompasses the full angular range of said third reflected light beam.

13. An apparatus according to claim 6, wherein said photodetecting means is provided inside said slit formation of said housing.

14. An apparatus according to claim 6, wherein photodetecting means outputs a signal representing the intensity of the light applied to detect by said photodetecting means, and which further comprises control means for controlling said exposure light source in accordance with the signal supplied from said photodetecting means, so that said exposure light source emits light of an adjusted intensity.

15. An apparatus according to claim 12 wherein said reflector, said photodetecting means and said slit are disposed so that said photodetecting means receives light reflected from a substantial portion of the entire length of said image carrier.

* * * * *